(12) United States Patent
Tandi et al.

(10) Patent No.: US 6,461,521 B
(45) Date of Patent: Oct. 8, 2002

(54) METHOD FOR TREATING AQUEOUS STREAMS CONTAINING LOW VALENT SULFUR COMPOUNDS

(75) Inventors: Branka M. Tandi, Oakville; Eric A. Devuyst, Grimsby; Domenic Canini, Richmond Hill, all of (CA)

(73) Assignee: Inco Limited, Toronto (CA)

( * ) Notice: Subject to any disclaimer, the term of this patent is extended or adjusted under 35 U.S.C. 154(b) by 0 days.

(21) Appl. No.: 09/712,448

(22) Filed: Nov. 14, 2000

(51) Int. Cl.$^7$ .................................................. C02F 1/72
(52) U.S. Cl. ...................... 210/758; 210/763; 210/904; 210/916
(58) Field of Search ................................ 210/758, 763, 210/904, 916

(56) References Cited

U.S. PATENT DOCUMENTS

| | | | |
|---|---|---|---|
| 4,537,686 A | 8/1985 | Borbely et al. | 210/713 |
| 4,615,873 A | 10/1986 | Devuyst et al. | 423/367 |
| 4,874,530 A | * 10/1989 | Kobayashi et al. | |
| 5,350,516 A | 9/1994 | Bhadra | 210/602 |
| 5,360,552 A | * 11/1994 | Yan | |

FOREIGN PATENT DOCUMENTS

| | | |
|---|---|---|
| CA | 1238995 | 7/1988 |
| DE | 3635219 A1 | 4/1988 |
| EP | 0362429 | 4/1990 |

OTHER PUBLICATIONS

J.N. Jensen, Y.J. Tuan, "chemical Oxidation of Thiocyanate Ion By Ozone", pp. 343–360, *Ozone Science and Engineering*, vol. 15, 1993.

W.G. Strunk, "Hydrogen Peroxide Treats Diverse Wastewaters", pp. 32–35, *Industrial Wastes*, Jan./Feb., 1979.

G.Y. Alibekov, I.N. Kashcheev, D.S. Starodubtsev, V.P. Tupitsyn, "Catalytic Oxidation of Thiocyanates and Cyanides with Ozone", pp. 72–74, Moscow Institute of Steel and Alloys, 1987.

J.R. Walton, J.A. Rutz, S.B. Magid "Pretreatment Through Chemical Oxidation. General Considerations And A Case Study Involving A Thiosulfate/Sulfide Laden Wastestream", pp. 523–527, Proceedings of the Industrial Waste Conference, Purdue University, 1985.

K.G. Tan, E. Rolia, "Chemical Oxidation Methods For The Treatment of Thiosalt–Containing Mill Effluents", pp. 303–310, *Canadian Metallurgical Quarterly*, vol. 24, No. 4, 1985.

J.T. Wearing, A. Garner, "Elimination of Thiosulphate From Paper–Machine White Water Using Inorganic Oxidants", pp. J100–J104, *Journal of Pulp and Paper Science*, vol. 17, No. 3, May 1991.

\* cited by examiner

*Primary Examiner*—Betsey Morrison Hoey
(74) *Attorney, Agent, or Firm*—Edward A. Steen

(57) ABSTRACT

A cost-effective broad temperature method for removing troublesome low valent sulfur compounds from aqueous streams. The process utilizes sulfur dioxide, oxygen and at least one metal catalyst (which may be added to or already entrained in the aqueous stream) to oxidize the low valent sulfur compounds.

33 Claims, No Drawings

METHOD FOR TREATING AQUEOUS STREAMS CONTAINING LOW VALENT SULFUR COMPOUNDS

TECHNICAL FIELD

This invention relates to the treatment of sulfur containing aqueous streams in general and, more particularly, to an economical and environmentally friendly process for oxidizing low valent sulfur compounds in solutions by using $SO_2$, $O_2$ and at least one metal catalyst. The metal catalyst may already be present in the stream, or can be added externally.

BACKGROUND OF THE INVENTION

Various processes can produce partially oxidized sulfur compounds, such as sulfide ($S^{2-}$) and thiosulfate ($S_2O_6^{2-}$) as a waste or by-product. These are typically present in aqueous solution. Depending upon the operating conditions, these species can be further oxidized to tetrathionate, ($S_4O_6^{2-}$) and trithionate ($S_3O_6^{2-}$). Collectively, these partially oxidized sulfur compounds are refered to as thiosalts and may be present in solution in varying concentrations. Eventually, these species will be oxidized to sulfate ($SO_4^{2-}$); however, this process can be very slow and will be greatly dependent upon the solution temperature, pH and upon the presence of metals or oxidizing bacteria.

The progressive natural oxidation of $S_2O_3^{2-}$, initially to $S_4O_6^{2-}$ and $S_3O_6^{2-}$ and then to $SO_4^{2-}$, leads to the formation of acid, which is of concern if these solutions are stored in an impoundment or disposed of to the environment. Also, a high concentration of partially oxidized thiospecies is associated with a high chemical oxygen demand, which is of concern when discharging to surface or ground waters. A minimum concentration of dissolved oxygen is required to support an aquatic ecosystem. The introduction of high levels of thiosalts into natural receiving waters may result in a reduction in the concentration of dissolved oxygen. This would limit the concentration and diversity of life that could be supported in these waters. For this reason, strict controls are placed upon the discharge of streams with a high associated chemical oxygen demand ("COD").

Treatment can be used to reduce the concentration of thiosalts within solution. This may be required prior to recycling solution within the process or to reduce the acid producing potential and chemical oxygen demand associated with the effluent prior to discharge into surface and ground waters. Treatment would involve the oxidation of the various thiosalts to $SO_4^{2-}$ and neutralisation with base.

The extent of oxidation of $S_2O_3^{2-}$ to $S_4O_6^{2-}$, $S_3O_6^{2-}$, and $SO_4^{2-}$ will effect the final acid producing potential and COD associated with the solution. It should be noted that if $S_2O_3^{2-}$ is only partially oxidized to $S_4O_6^{2-}$ and $S_3O_6^{2-}$, more acid would be produced, per mol of $S_2O_3^{2-}$ originally present, as a result of the oxidation of each of these species. This would lead to an effluent with a greater acid producing potential. For this reason, the $S_2O_3^{2-}$ should be completely oxidized to $SO_4^{2-}$ when using acid producing potential as the criteria for final effluent quality. When considering the related COD, each subsequent oxidation will result in a slight reduction in the associated oxygen demand; therefore, this may affect the treatment requirements, when using COD as the basis for final effluent quality.

Current treatment technologies employ strong chemical oxidants such as ozone, peroxides, Carro's acid or hypochlorite. Bacterial oxidation has also been used. These methods, although effective, are often expensive or have severe temperature and operating limitations. In addition, they may introduce unwanted reaction by-products that may cause secondary concerns.

$SO_2$ and $O_2$ have been successfully employed in the treatment of cyanide containing effluents. In this instance, copper is used as a catalyst. Please see Borberly et al., U.S. Pat. No. 4,537,686. Only partial oxidation of sulfide and thiosalts is achieved in this system. In order to achieve complete oxidation of these species, an additional metal catalyst must be added in conjunction with the copper or an alternative catalyst is required.

The process described herein provides a safe, effective and potentially economical way to remove thiospecies from solution. It will not introduce any secondary reaction products that could prove to be problematic, and it has potentially wide application in a number of industrial areas; for example, in the treatment of effluents from pulp and paper mills, sulfide ores mining, photo processing plants, petroleum refining and coking operations, all of which contain thiospecies.

SUMMARY OF THE INVENTION

The present invention utilizes $SO_2$ and $O_2$ in the oxidation of low valent sulfur compounds contained in aqueous solution. In the presence of a metal catalyst, all low valent sulfur compounds including sulfide ($S^{2-}$), thiosulfate ($S_2O_3^{2-}$), tetrathionate ($S_4O_6^{2-}$) and trithionate ($S_3O_6^{2-}$) can be completely oxidized to sulfate ($SO_4^{2-}$). Oxidation of thiosalts using $SO_2$ and $O_2$ in the presence of a catalyst offers a safe and effective alternative to the treatment technologies that are currently available.

Treatment takes place at atmospheric pressure and ambient temperature. The process has been demonstrated to work effectively at temperatures from about freezing to room temperature. Moreover, there is a potential for application at higher temperatures.

One or a combination of the transition metals is required to catalyze the oxidation reaction. These metals may be present within the feed or they can be added separately to the reaction vessel. Copper, nickel, cobalt, iron and manganese are among those that were found to work well.

The pH of the reaction media will determine the forms in which these metal species will be present and the relevant equilibrium reactions that will take place. A specific operating pH is associated with each catalytic system. At the proper pH, the active catalytic species will be formed and can be effectively regenerated. The optimum pH will be dependent upon the transition metal(s) employed and ranges from approximately 2 to 11.

Treatment takes place continuously in a vessel, preferably a stirred tank reactor. Sulfur dioxide and air, which provides the oxygen for the reaction (or pure oxygen if available), are added to the reaction vessel on a continuous basis and, in the presence of the transition metal catalyst, serve to oxidize the low valent sulfur compounds that are present in solution. The $SO_2$ dosage will be dependent upon the feed characteristics, catalyst employed, and upon the required effluent quality. The air addition rate and the amount of agitation should be sufficient to ensure that the proper oxygen transfer rates are maintained.

PREFERRED MODE FOR USE OF THE INVENTION

The present invention involves a chemical treatment process for the oxidation and neutralization of low valent sulfur species contained in waste solutions. It can be used as a primary treatment, or it can be used in conjunction with other chemical or physical treatment stages. The waste solution may contain metals and various other contaminants. It can be pumped directly from a process or storage impoundment, and the solution temperature may vary from about 0 to 100° C.

The terms "about" or "approximately" before a series of values, unless otherwise indicated, will be interpreted as applying to each value in the series.

Treatment takes place on a continuous basis following initial batch treatment. During the treatment process, the solution is intimately contacted with sulfur dioxide, oxygen and base. The required reagents are available in many forms; however, for this process, gaseous or liquid $SO_2$, air, and lime are typically preferred.

There are a number of reactions involved in the oxidation of thiosalts to $SO_4^{2-}$. Complete oxidation can not be achieved in the presence of $SO_2$ and $O_2$ alone; the kinetics are too slow. Each step must be catalysed. It was found that one or often two different catalytic species are required to achieve a good effluent quality.

Various transition metals can be effectively employed as catalysts. Copper, manganese, iron, nickel, zinc and cobalt can be used either alone or in combination to catalyse the system of reactions. Each of these metals has a given role or serves a specific function within the system, and, in some instances, metals can be used interchangeably. The operating pH is very important and will vary, from about 2 to 11, depending upon the metal or combination of metals employed. Often, the metals required for catalysis naturally occur within the feed solution. If this is not the case, then the required metals can be added externally as solutions of dissolved salts.

The concentration of catalyst will vary depending upon the metals employed and upon the operating conditions encountered. The $SO_2$ dosage, retention time, and oxygen requirements will be dependent upon the feed composition, operating conditions and required effluent quality. Typically, a minimum of approximately 1.5 g $SO_2$/g $S_2O_3^{2-}$ was required to achieve a good effluent quality. The retention time will be greatly dependent upon the operating temperature. At lower temperatures, a higher retention time is required to compensate for the slower reaction kinetics.

Experimental testwork was initiated to investigate the oxidation of low valent sulfur species in the presence of $SO_2$ and $O_2$. Testwork was designed to investigate the important reaction variables. In each instance, controls were used to demonstrate the independent effect of each variable upon the results achieved.

Synthetic feed solutions were used in all tests. These were prepared by dissolving sodium thiosulfate ($Na_2S_2O_3 \cdot 5H_2O$) and various metal salts in distilled water. A continuous stirred tank reactor was employed to contact the feed solution with $SO_2$ and oxygen in the presence of the metal catalyst(s). The operating pH and temperature were maintained at a constant value.

Typically, an initial batch treatment was performed. The solution from the batch test was then used as the starting material for continuous treatment. During continuous treatment, feed solution was pumped continuously into the reaction vessel at a controlled rate. The $SO_2$ was added as a solution of $Na_2S_2O_5$; it was metered in direct proportion to the feed. Compressed air was used to provide the oxygen for the reaction. It was sparged into the reactor through a vertical inlet tube which terminated close to a turbine disposed in the vessel. Air was added, as required, to maintain the dissolved oxygen in the desired range.

Various metals were used throughout this investigation. Some were present within the feed; however, on occasion, the catalyst was added externally to the reactor as a dissolved metal salt solution. A lime suspension was used to control the operating pH. The base was added in response to the measured pH of the reactor.

Samples of treated effluent were collected throughout each test. Each sample was filtered and analyzed for related species. Representative feed samples were also analyzed.

Analyses were performed to determine the COD and the concentrations of $S_2O_3^{2-}$, $S_4O_6^{2-}$, $S_3O^{62-}$, $SO_4^{2-}$ and $S_{TO-TAL}$. Determination of COD involved sample oxidation followed by titration. $S_2O^{32-}$, $S_4O_6^{2-}$ and $S_3O_6^{2-}$ were analyzed using calorimetric methods. $SO_4^{2-}$ was analyzed using the high pressure liquid chromatography ("HPLC") method, and total sulfur ($S_{TOT}$) was determined gravimetrically. During sulfide oxidation, in addition to those species listed above, $S^{2-}$ analyses were performed using precipitation with cadmium acetate followed by titration. In all cases, the concentration of metals in the feed and effluent samples were determined using either atomic absorption or ICP.

The following examples illustrate various aspects relating to thiosalt oxidation in the $SO_2$ and $O_2$ system:

EXAMPLE I

In the first set of examples, presented in Table 1, the effect of aeration, $SO_2$ addition and copper are examined. As demonstrated in test A1, $S_2O_3^{2-}$ was only marginally removed in the presence of $O_2$ alone. The addition of either $SO_2$ or copper, in the presence of $O_2$, served to increase the level of oxidation achieved; however, only partial oxidation of $S_2O_3^{2-}$ was obtained.

In test #A4, $SO_2$, at a dosage of 3 g $SO_2$/g $S_2O_3^{2-}$, and oxygen were added in the presence of 10 mg/L copper. These were contacted with feed solution in a continuous stirred tank reactor operating with a retention time of 60 minutes. These conditions are typical of those used in the treatment of cyanide containing effluents, as described in Borberly, et al., U.S. Pat. No. 4,537,686. Results were better than those obtained in tests A1 through A3. $S_2O_3^{2-}$ was almost completely oxidized to $S_3O_6^{2-}$; however, further oxidation to $SO_4^{2-}$ was not achieved. The acid producing potential of the effluent remained high due to the high concentration of $S_3O_6^{2-}$ remaining.

TABLE I

**THIOSULFATE REMOVAL FROM SYNTHETIC SOLUTION
EFFECT OF AIR, $SO_2$ AND $Cu^{2+}$ ADDITION, AT ROOM TEMPERATURE**

Feed: Synthetic solution: 500 mg/L $S_2O_3^{2-}$ as $Na_2S_2O_3.5H_2O$
Conditions: Continuous flow using $Na_2S_2O_5$ as $SO_2$ reagent, $Cu^{2+}$ reagent as a solution of $CuSO_4.5H_2O$, $Ca(OH)_2$ for maintaining pH, 700 ml reactor volume, 800 rpm agitator speed, 1.0 L/min. air flow, 60 minutes retention time.

| Test | Stream | pH | Assays (mg/L) | | | | | | | Reagents | | |
|---|---|---|---|---|---|---|---|---|---|---|---|---|
| | | | $S_2O_3^{2-}$ | $S_4O_6^{2-}$ | $S_3O_6^{2-}$ | $SO_4^{2-}$ | $S_{TOT}$ | Cu | Ni | $SO_2$ g/g $S_2O_3^{2-}$ | $Cu^{2+}$ mg/L | $Ni^{2+}$ mg/L |
| | Feed | — | 525 | <10 | <10 | 2 | 290 | <0.1 | <0.1 | — | — | — |
| A1 | Treated | 9.0 | 491 | <10 | <10 | 18 | 274 | <0.1 | <0.1 | 0 | 0 | 0 |
| | Feed | — | 560 | 45 | <10 | 4 | 293 | <0.1 | <0.1 | — | — | — |
| A2 | Treated | 10 | 350 | 105 | 107 | 305 | 649 | <0.1 | <0.1 | 3.0 | 0 | 0 |
| | Feed | — | 525 | <10 | <10 | 2 | 290 | <0.1 | <0.1 | — | — | — |
| A3 | Treated | 9.0 | 454 | 16 | <10 | 88 | 273 | <0.1 | <0.1 | 0 | 10 | 0 |
| | Feed | — | 560 | 45 | <10 | 4 | 293 | <0.1 | <0.1 | — | — | — |
| A4 | Treated | 10 | 27 | 45 | 407 | 1180 | 764 | 0.8 | <0.1 | 3.0 | 10 | 0 |

EXAMPLE II

In the examples presented in Table II, the effect of adding copper in conjunction with manganese is examined.

As can be seen in test A5, poor results are achieved when manganese alone is added at a concentration of 100 mg/L, at a pH of 5.0. Under similar conditions, in test A6, when 10 mg/L of $Cu^{2+}$ is added in the presence of manganese, almost complete oxidation is achieved, as demonstrated by low COD value.

TABLE II

**THIOSULFATE REMOVAL FROM SYNTHETIC SOLUTION
EFFECT OF COPPER ADDITION AT CONSTANT MANGANESE,
AT ROOM TEMPERATURE**

Feed: Synthetic solution: 350 mg/L $S_2O_3^{2-}$ as $Na_2S_2O_3.5H_2O$
Conditions: Continuous flow using $Na_2S_2O_5$ as $SO_2$ reagent, $Cu^{2+}$ reagent as a solution of $CuSO_4.5H_2O$, $Ca(OH)_2$ for maintaining pH, 1580 ml reactor volume, 800 rpm agitator speed, 1.5 L/min. air flow, 60 minutes retention time.

| Test | Stream | pH | Assays (mg/L) | | | | | COD mg/L | Reagents | |
|---|---|---|---|---|---|---|---|---|---|---|
| | | | $S_2O_3^{2-}$ | $S_4O_6^{2-}$ | $S_3O_6^{2-}$ | Mn | Cu | | $SO_2$ g/g $S_2O_3^{2-}$ | $Cu^{2+}$ mg/L |
| | Feed | 3.1 | 350 | 17 | <10 | 101 | — | 167 | — | — |
| A5 | Treated | 5.0 | 328 | 15 | — | 95 | — | 256 | 2.2 | 0 |
| | Feed | 3.0 | 350 | 32 | <10 | 99 | — | 183 | — | — |
| A6 | Treated | 5.0 | 3 | 16 | <10 | 38 | 7.5 | 12 | 2.1 | 11 |

EXAMPLE III

In Table III, a different catalytic system is investigated. In this system, iron and manganese are employed to catalyze the system of reactions. The tests were conducted at pH 2.5 with the addition of 2.0 g $SO_2$/g $S_2O_3^{2-}$.

As demonstrated by test A7, only partial oxidation of $S_2O_3^{2-}$ is achieved in the presence of iron, $SO_2$ and $O_2$. High levels of $S_4O_6^{2-}$ and $S_3O_6^{2-}$ remained in the treated effluent. Under similar operating conditions, when iron was replaced with manganese addition, in test A8, poor treatment results were achieved.

Both iron and manganese were required to catalyze the oxidation of $S_2O_3^{2-}$ to $SO_4^{2-}$ with $SO_2$ and $O_2$. This is demonstrated in test A9. In this instance, complete oxidation of thiosalts was achieved with the addition of 150 mg/L Fe and approximately 100 mg/L manganese.

Using the COD value as an indication of effluent quality, it is apparent from the results that the use of manganese in conjunction with iron to catalyze the system of reactions results in a superior effluent.

TABLE III

THIOSULFATE REMOVAL FROM SYNTHETIC SOLUTION
EFFECT OF IRON AND MANGANESE, AT ROOM TEMPERATURE

Feed: Synthetic solution: 350 mg/L $S_2O_3^{2-}$ as $Na_2S_2O_3.5H_2O$
Conditions: Continuous flow using $Na_2S_2O_5$ as $SO_2$ reagent, $Ca(OH)_2$ for maintaining pH, 800 ml reactor volume, 1000 rpm agitator speed, 1.0 L/min. air flow, 60 minutes retention time.

| Test | Stream | pH | $S_2O_3^{2-}$ | $S_4O_6^{2-}$ | $S_3O_6^{2-}$ | Fe | Mn | Cu | Ni | COD (mg/L) | Reagents $SO_2$ g/g $S_2O_3^{2-}$ |
|---|---|---|---|---|---|---|---|---|---|---|---|
|    | Feed    | 3.0 | 358 | 31  | <10 | 205 | 0.2 | 0.1 | 0.1 | 215 | — |
| A7 | Treated | 2.5 | <1  | 108 | 38  | 203 | 0.2 | 0.1 | 0.1 | 50  | 2.1 |
|    | Feed    | 3.0 | 350 | 110 | <10 | —   | 103 | —   | —   | 178 | — |
| A8 | Treated | 2.5 | 321 | 138 | —   | —   | 95  | —   | —   | 256 | 2.2 |
|    | Feed    | 3.0 | 357 | 17  | <10 | 153 | 103 | 0.1 | 0.1 | 192 | — |
| A9 | Treated | 2.5 | 3   | 1   | 13  | 146 | 98  | 0.1 | 0.1 | 4   | 2.1 |

EXAMPLE IV

The effectiveness of manganese and iron as catalysts was examined at different pH values. These results are presented in Table IV. In these tests, the $SO_2$ dosage was maintained at 2.0 g $SO_2$/g $S_2O_3^{2-}$. Approximately 50 mg/L of manganese and iron were added in each test.

As demonstrated by tests A10 and A11, complete oxidation of $S_2O_3^{2-}$ was achieved at both pH values studied, 2.5 and 5.0. This suggests that manganese and iron can be effectively employed to catalyze this system of reactions within the approximate range of pH 2.5 and 5.0.

EXAMPLE V

The effect of iron concentration on the oxidation of $S_2O_3^{2-}$, at constant manganese addition is presented in Table V. In this set of experiments, the $SO_2$ dosage and manganese addition rate were maintained at 2.0 g/g $S_2O_3^{2-}$ and 50 mg/L respectively. These tests were performed at pH 2.5.

The iron concentration was varied from 150 to approximately 50 mg/L in the feed. A slight increase in the residual concentration of $S_4O_6^{2-}$ and in the related COD values was noted as the concentration of iron was lowered. However, as can be seen in test A10, A12 and A13, an excellent effluent quality was achieved in each case.

TABLE IV

THIOSULFATE REMOVAL FROM SYNTHETIC SOLUTION
EFFECT OF pH AT CONSTANT IRON AND MANGANESE, AT ROOM TEMPERATURE

Feed: Synthetic solution: 350 mg/L $S_2O_3^{2-}$ as $Na_2S_2O_3.5H_2O$
Conditions: Continuous flow using $Na_2S_2O_5$ as $SO_2$ reagent, $Ca(OH)_2$ for maintaining pH, 800 ml reactor volume, 1000 rpm agitator speed, 1.0 L/min. air flow, 60 minutes retention time.

| Test | Stream | pH | $S_2O_3^{2-}$ | $S_4O_6^{2-}$ | $S_3O_6^{2-}$ | Fe | Mn | Cu | Ni | COD (mg/L) | Reagents $SO_2$ g/g $S_2O_3^{2-}$ |
|---|---|---|---|---|---|---|---|---|---|---|---|
|     | Feed    | 3.0 | 336 | 51 | <10 | 52  | 52 | 0.1 | 0.1 | 190 | — |
| A10 | Treated | 2.5 | 3   | 44 | 1   | 52  | 51 | 0.1 | 0.1 | 26  | 2.2 |
|     | Feed    | 3.0 | 351 | 30 | <10 | 52  | 50 | 0.1 | 0.1 | 184 | — |
| A11 | Treated | 5.0 | 3   | 29 | 13  | 1.0 | 45 | 0.1 | 0.1 | 19  | 2.1 |

TABLE V

THIOSULFATE REMOVAL FROM SYNTHETIC SOLUTION
EFFECT OF IRON AT CONSTANT MANGANESE, AT ROOM TEMPERATURE

Feed: Synthetic solution: 350 mg/L $S_2O_3^{2-}$ as $Na_2S_2O_3.5H_2O$
Conditions: Continuous flow using $Na_2S_2O_5$ as $SO_2$ reagent, $Ca(OH)_2$ for maintaining pH, 800 ml reactor volume, 1000 rpm agitator speed, 1.0 L/min. air flow, 60 minutes retention time.

| Test | Stream | pH | $S_2O_3^{2-}$ | $S_4O_6^{2-}$ | $S_3O_6^{2-}$ | Fe | Mn | Cu | Ni | COD (mg/L) | Reagents $SO_2$ g/g $S_2O_3^{2-}$ |
|---|---|---|---|---|---|---|---|---|---|---|---|
|     | Feed    | 3   | 335 | 44 | <10 | 148 | 50 | 0.1 | 0.1 | 196 | — |
| A12 | Treated | 2.5 | 2   | 1  | 3   | 134 | 49 | 0.1 | 0.1 | 2   | 2.1 |
|     | Feed    | 3   | 347 | 32 | <10 | 99  | 50 | 0.1 | 0.1 | 192 | — |
| A13 | Treated | 2.5 | 2   | 16 | 1   | 91  | 50 | 0.1 | 0.1 | 6   | 2.0 |

TABLE V-continued

| | | | | | | | | | | | |
|---|---|---|---|---|---|---|---|---|---|---|---|
| | Feed | 3 | 336 | 51 | <10 | 52 | 52 | 0.1 | 0.1 | 190 | — |
| A10 | Treated | 2.5 | 3 | 44 | 1 | 52 | 51 | 0.1 | 0.1 | 26 | 2.1 |

EXAMPLE VI

The effect of manganese concentration on the oxidation of $S_2O_3^{2-}$, at constant iron addition rate, is presented in Table VI. In this set of experiments the $SO_2$ dosage and iron concentration were maintained at 2.0 g $SO_2$/g $S_2O_3^{2-}$ and approximately 150 mg/L respectively. These tests were conducted at a pH of 2.5.

The concentration of manganese was varied from approximately 50 to 27 mg/L. Although complete oxidation of $S_2O_3^{2-}$ was achieved at the higher addition rate, high residual $S_4O_6^{2-}$ remained when 27 mg/L manganese was employed, indicating that insufficient manganese was available to catalyze the oxidation reaction.

test A15. In this test, the reaction was lost within the first displacement. Under similar operating conditions, in which the same amount of iron was added externally as $Fe^{3+}$, complete oxidation of $S_2O_3^{2-}$ was achieved. This is demonstrated in test A 16.

It is suspected that the kinetics associated with the oxidation of iron, to $Fe^{3+}$, are severely limited at low temperature. By introducing iron at the higher oxidation state, we are overcoming this rate limiting step, resulting in enhanced oxidation.

TABLE VI

THIOSULFATE REMOVAL FROM SYNTHETIC SOLUTION
EFFECT OF MANGANESE AT CONSTANT IRON, AT ROOM TEMPERATURE

Feed: Synthetic solution: 350 mg/L $S_2O_3^{2-}$ as $Na_2S_2O_3 \cdot 5H_2O$
Conditions: Continuous flow using $Na_2S_2O_5$ as $SO_2$ reagent, $Ca(OH)_2$ for maintaining pH, 800 ml reactor volume, 1000 rpm agitator speed, 1.0 L/min. air flow, 60 minutes retention time.

| | | | Assays (mg/L) | | | | | | | COD | Reagents $SO_2$ |
|---|---|---|---|---|---|---|---|---|---|---|---|
| Test | Stream | pH | $S_2O_3^{2-}$ | $S_4O_6^{2-}$ | $S_3O_6^{2-}$ | Fe | Mn | Cu | Ni | (mg/L) | g/g $S_2O_3^{2-}$ |
| | Feed | 3 | 335 | 44 | <10 | 148 | 50 | 0.1 | 0.1 | 196 | — |
| A12 | Treated | 2.5 | 2 | 1 | 3 | 134 | 49 | 0.1 | 0.1 | 2 | 2.1 |
| | Feed | 3 | 340 | 50 | <10 | 145 | 27 | 0.1 | 0.1 | 205 | — |
| A14 | Treated | 2.5 | 1 | 113 | 2 | 137 | 26 | 0.1 | 0.1 | 52 | 2.0 |

EXAMPLE VII

In tests A7 through A 15, in which iron and manganese are employed as catalysts, the iron is added into the feed. In these tests, iron is in the form of $Fe^{2+}$, which is subsequently oxidized within the reactor to $Fe^{3+}$. It is the $Fe^{3+}$ species that is important in the oxidation of thiosalts.

In tests conducted at low temperature, in which $Fe^{2+}$ was introduced, poor results were achieved, as demonstrated by

TABLE VII

THIOSULFATE REMOVAL FROM SYNTHETIC SOLUTION
EFFECT OF FERRIC ADDED EXTERNALLY AT LOW TEMPERATURE

Feed: Synthetic solution: 350 mg/L $S_2O_3^{2-}$ as $Na_2S_2O_3 \cdot 5H_2O$
Conditions: Continuous flow thiosulfate removal using $Na_2S_2O_5$ as $SO_2$ reagent, $Fe^{3+}$ reagent as a solution of $Fe_2(SO_4)_3$, $Ca(OH)_2$ for maintaining pH, 1600 ml reactor volume, 1000 rpm agitator speed, 2.0 L/min. air flow, 100 minutes retention time.

| | | | Temp. | Assays (mg/L) | | | | | | | COD | Reagents $SO_2$ | $Fe^{3+}$ |
|---|---|---|---|---|---|---|---|---|---|---|---|---|---|
| Test | Stream | pH | °C. | $S_2O_3^{2-}$ | $S_4O_6^{2-}$ | $S_3O_6^{2-}$ | Fe | Mn | Cu | Ni | mg/L | g/g $S_2O_3^{2-}$ | (mg/L) |
| | Feed | 2.9 | — | 345 | 32 | <10 | 104 | 53 | 0.1 | 0.1 | 194 | — | — |
| A15 | Treated | 2.5 | 11 | 7 | 220 | <10 | 102 | 51 | 0.1 | 0.1 | 139 | 2.1 | 0 |
| | Feed | 3.0 | — | 295 | 73 | <10 | 0.1 | 26 | 0.1 | 0.1 | 180 | — | — |
| A16 | Treated | 2.5 | 12 | 2 | 8 | 2 | 122 | 24 | 0.1 | 0.1 | 7 | 2.0 | 113 |

EXAMPLE VIII

Test A17, table VIII, demonstrates that at an $SO_2$ dosage of 2.0 g/g $S_2O_3^{2-}$ and a retention time of 100 minutes, 50 mg/L $Fe^{3+}$ in conjunction with 50 mg/L manganese is sufficient to catalyze the complete oxidation of $S_2O_3^{2-}$ to $SO_4^{2-}$, when operating at low temperature.

oxidation of $S_2O_3^{2-}$ to $SO_4^{2-}$. High levels of $S_2O_3^{2-}$, $S_4O_6^{2-}$ and $S_3O_6^{2-}$ remained in the treated effluent. As demon-

TABLE VIII

THIOSULFATE REMOVAL FROM SYNTHETIC SOLUTION
APPLICATION OF FERRIC AND MANGANESE, AT LOW TEMPERATURE

Feed: Synthetic solution: 350 mg/L $S_2O_3^{2-}$ as $Na_2S_2O_3 \cdot 5H_2O$
Conditions: Continuous flow thiosulfate removal using $Na_2S_2O_5$ as $SO_2$ reagent, $Fe^{3+}$ reagent as a solution of $Fe_2(SO_4)_3$, $Ca(OH)_2$ for maintaining pH, 1600 ml reactor volume, 1000 rpm agitator speed, 2.0 L/min. air flow, 100 minutes retention time.

| Test | Stream | pH | Temp. °C. | \multicolumn{5}{c}{Assays (mg/L)} | | | | COD mg/L | Reagents SO$_2$ g/g S$_2$O$_3^{2-}$ | Fe$^{3+}$ (mg/L) |
|---|---|---|---|---|---|---|---|---|---|---|---|---|---|
| | | | | $S_2O_3^{2-}$ | $S_4O_6^{2-}$ | $S_3O_6^{2-}$ | Fe | Mn | Cu | Ni | | | |
| | Feed | 3 | — | 336 | 38 | <10 | 0.1 | 50 | 0.1 | 0.1 | 180 | — | — |
| A17 | Treated | 2.5 | 12 | 2 | 25 | 2 | 53 | 45 | 0.1 | 0.1 | 13 | 2.0 | 47 |

EXAMPLE IX

In this example, the oxidation of $S_2O_3^{2-}$ takes place at a pH of 2.4 in the presence of various metal species. Iron, manganese, zinc and lead were all present in significant concentrations within the feed. Good results were achieved at room temperature using a retention time of 110 minutes.

strated in test A4, Table I, copper was not effective in catalyzing the complete oxidation of $S_2O_3^{2-}$.

When nickel was added in conjunction with copper, as demonstrated in B2, an excellent effluent quality was achieved. In the presence of approximately 70 mg/L $Ni^{2+}$ and 10 mg/L $Cu^{2+}$, complete oxidation of $S_2O_3^{2-}$ was realized.

TABLE IX

THIOSULFATE REMOVAL FROM SYNTHETIC SOLUTION
OXIDATION OF THIOSULFATE IN THE PRESENCE OF VARIOUS METALS, AT ROOM TEMPERATURE

Feed: Synthetic solution: 350 mg/L $S_2O_3^{2-}$ as $Na_2S_2O_3 \cdot 5H_2O$
Conditions: Continuous flow thiosulfate removal using $Na_2S_2O_5$ as $SO_2$ reagent, $Ca(OH)_2$ for maintaining pH, 800 ml reactor volume, 700 rpm agitator speed, 1.0 L/min. air flow, 110 minutes retention time.

| Test | Stream | pH | $S_2O_3^{2-}$ | $S_4O_6^{2-}$ | $S_3O_6^{2-}$ | Fe | Mn | Zn | Pb | Cu | Ni | Co | COD mg/L | Reagent SO$_2$ g/g S$_2$O$_3^{2-}$ |
|---|---|---|---|---|---|---|---|---|---|---|---|---|---|---|
| | Feed | — | 315 | 59 | 1.0 | 140 | 100 | 155 | 22 | 1.3 | 1.1 | 1.3 | 198 | — |
| A18 | Treated | 2.4 | 1.0 | 17.0 | 1.0 | 136 | 98 | 165 | 7.0 | 2.1 | 2.9 | 1.2 | 14 | 2.2 |

EXAMPLE X

In test B1, Table X, the addition of Ni alone, in the presence of $SO_2$ and $O_2$, was not sufficient to catalyze the

TABLE X

THIOSULFATE REMOVAL FROM SYNTHETIC SOLUTION
EFFECT OF Ni$^{2+}$ AT CONSTANT Cu$^{2+}$ ADDITION, AT ROOM TEMPERATURE

Feed: Synthetic solution: 500 mg/L $S_2O_3^{2-}$ as $Na_2S_2O_3 \cdot 5H_2O$
Conditions: Continuous flow thiosulfate removal using $Na_2S_2O_5$ as $SO_2$ reagent, $Cu^{2+}$ reagent as a solution of $CuSO_4 \cdot 5H_2O$, $Ni^{2+}$ reagent as a solution of $NiSO_4 \cdot 6H_2O$, $Ca(OH)_2$ for maintaining pH, 700 ml reactor volume, 800 rpm agitator speed, 1.0 L/min. air flow, 60 minutes retention time.

| Test | Stream | pH | $S_2O_3^{2-}$ | $S_4O_6^{2-}$ | $S_3O_6^{2-}$ | $SO_4^{2-}$ | $S_{TOT}$ | Cu | Ni | SO$_2$ g/g S$_2$O$_3^{2-}$ | Cu$^{2+}$ mg/L | Ni$^{2+}$ mg/L |
|---|---|---|---|---|---|---|---|---|---|---|---|---|
| | Feed | — | 510 | 64 | <10 | 11 | 305 | <0.1 | <0.1 | — | — | — |
| B1 | Treated | 9 | 227 | 47 | 51 | 1909 | 1060 | <0.1 | 9.3 | 5.1 | 0 | 71 |
| | Feed | — | 560 | 46 | <2 | 5 | 290 | <0.1 | <0.1 | — | — | — |
| B2 | Treated | 10 | 2 | 5 | 6 | 3125 | 1085 | <0.1 | 0.4 | 2.9 | 9 | 71 |

EXAMPLE XI

Table XI is used to demonstrate the effect of pH on the oxidation of $S_2O_3^{2-}$ when nickel and copper are employed as catalyst. In this system of reactions, the $SO_2$, copper and nickel addition rates were maintained at approximately 3.0 g/g $S_2O_3^{2-}$, 5 mg/L and 75 mg/L respectively. The pH was varied from 6.5 to 10.0.

The best results were achieved at the higher pH values of 9.5 and 10.0. A good effluent quality was obtained with almost complete oxidation of $S_2O_3^{2-}$ to $SO_4^{2-}$. Only partial oxidation was achieved at the lower pH values.

EXAMPLE XIII

In Table XIII, the effect of nickel addition rate is examined. In tests B2 and B9, Table XIII, the rate of copper addition was maintained at 10 mg/L, and the rate of $Ni^{2+}$ addition was varied from 50 to 70 mg/L. Approximately 3 g $SO_2/S_2O_3^{2-}$ was added in each instance, and the pH of the reaction was maintained at 10.

A nickel addition rate of approximately 50 mg/L was found to be sufficient to achieve effective oxidation of thiosulfate. When the addition rate was increased to 70 mg/L, comparable results were achieved.

TABLE XI

THIOSULFATE REMOVAL FROM SYNTHETIC SOLUTION
EFFECT OF pH AT CONSTANT $Cu^{2+}$ AND $Ni^{2+}$ ADDITION, AT ROOM TEMPERATURE

Feed: Synthetic solution: 500 mg/L $S_2O_3^{2-}$ as $Na_2S_2O_3 \cdot 5H_2O$
Conditions: Continuous flow thiosulfate removal using $Na_2S_2O_5$ as $SO_2$ reagent, $Cu^{2+}$ reagent as a solution of $CuSO_4 \cdot 5H_2O$, $Ni^{2+}$ reagent as a solution of $NiSO_4 \cdot 6H_2O$, $Ca(OH)_2$ for maintaining pH, 700 ml reactor volume, 800 rpm agitator speed, 1.0 L/min. air flow, 60 minutes retention time.

| | | | Assays (mg/L) | | | | | | Reagents | | |
|---|---|---|---|---|---|---|---|---|---|---|---|
| Test | Stream | pH | $S_2O_3^{2-}$ | $S_4O_6^{2-}$ | $S_3O_6^{2-}$ | $SO_4^{2-}$ | $S_{TOT}$ | Cu | Ni | $SO_2$ g/g $S_2O_3^{2-}$ | $Cu^{2+}$ mg/L | $Ni^{2+}$ mg/L |
| | Feed | 6.5 | 530 | 59 | <5 | 5 | 280 | <0.1 | <1 | — | — | — |
| B3 | Treated | 10 | <2 | 19 | 28 | 2985 | 1043 | <0.1 | 0.3 | 2.9 | 5 | 76 |
| B4 | Treated | 9.5 | <2 | 12 | 6 | 3010 | 1046 | <0.1 | 1.5 | 2.9 | 5 | 76 |
| B5 | Treated | 8.0 | 4 | 160 | 530 | 1830 | 1052 | 1.1 | 62 | 2.8 | 5 | 78 |
| B6 | Treated | 6.5 | <2 | <10 | 592 | 1960 | 1089 | 4.8 | 75 | 2.9 | 5 | 78 |

EXAMPLE XII

In Table XII, the effect of copper addition is examined. In this set of experiments, the copper concentration was varied from 1 to 59 mg/L under constant operating conditions. In each case, an $SO_2$ dosage of 3 g/g $S_2O_3^{2-}$ and approximately 70–75 mg/L nickel was used. The pH of the reaction was maintained at 10.0.

The best results were achieved with the addition of 9 mg/L $Cu^{2+}$, as demonstrated in test B2; however, good results were obtained with the addition of as little as 1 mg/L $Cu^{2+}$. The poor results achieved in test B8 suggests that higher addition rates, in the order of 59 mg/L, may be detrimental to the final effluent quality.

TABLE XII

THIOSULFATE REMOVAL FROM SYNTHETIC SOLUTION
EFFECT OF $Cu^{2+}$ AT CONSTANT $Ni^{2+}$ ADDITION, AT ROOM TEMPERATURE

Feed: Synthetic solution: 500 mg/L $S_2O_3^{2-}$ as $Na_2S_2O_3 \cdot 5H_2O$
Conditions: Continuous flow thiosulfate removal using $Na_2S_2O_5$ as $SO_2$ reagent, $Cu^{2+}$ reagent as a solution of $CuSO_4 \cdot 5H_2O$, $Ni^{2+}$ reagent as a solution of $NiSO_4 \cdot 6H_2O$, $Ca(OH)_2$ for maintaining pH, 700 ml reactor volume, 800 rpm agitator speed, 1.0 L/min. air flow, 60 minutes retention time.

| | | | Assays (mg/L) | | | | | | | Reagents | | |
|---|---|---|---|---|---|---|---|---|---|---|---|---|
| Test | Stream | pH | $S_2O_3^{2-}$ | $S_4O_6^{2-}$ | $S_3O_6^{2-}$ | $SO_4^{2-}$ | $S_{TOT}$ | Cu | Ni | $SO_2$ g/g $S_2O_3^{2-}$ | $Cu^{2+}$ mg/L | $Ni^{2+}$ mg/L |
| | Feed | — | 540 | 46 | <10 | 5 | 290 | <0.1 | <0.1 | — | — | — |
| B7 | Treated | 10.0 | 2 | 16 | 13 | 3200 | 1115 | <0.1 | 0.3 | 3.1 | 1 | 76 |
| B3 | Treated | 10.0 | <2 | 19 | 28 | 2985 | 1043 | <0.1 | 0.3 | 2.9 | 5 | 76 |
| B2 | Treated | 10.0 | 2 | 5 | 6 | 3125 | 1085 | <0.1 | 0.4 | 2.9 | 9 | 71 |
| | Feed | — | 523 | 15 | <10 | 2 | 293 | <0.1 | <0.1 | — | — | — |
| B8 | Treated | 10.0 | 14 | 31 | 386 | 1810 | 946 | 1.4 | 0.1 | 2.8 | 59 | 68 |

TABLE XIII

THIOSULFATE REMOVAL FROM SYNTHETIC SOLUTION
EFFECT OF VARIABLE $Ni^{2+}$ AT CONSTANT $Cu^{2+}$ ADDITION, AT ROOM TEMPERATURE

Feed: Synthetic solution: 500 mg/L $S_2O_3^{2-}$ as $Na_2S_2O_3.5H_2O$
Conditions: Continuous flow thiosulfate removal using $Na_2S_2O_5$ as $SO_2$ reagent, $Cu^{2-}$ reagent as a solution of $CuSO_4.5H_2O$, $Ni^{2+}$ reagent as a solution of $NiSO_4.6H_2O$, $Ca(OH)_2$ for maintaining pH, 700 ml reactor volume, 800 rpm agitator speed, 1.0 L/min. air flow, 60 minutes retention time.

| Test | Stream | pH | Assays (mg/L) | | | | | | | Reagents | | |
| | | | $S_2O_3^{2-}$ | $S_4O_6^{2-}$ | $S_3O_6^{2-}$ | $SO_4^{2-}$ | $S_{TOT}$ | Cu | Ni | $SO_2$ g/g $S_2O_3^{2-}$ | $Cu^{2+}$ mg/L | $Ni^{2+}$ mg/L |
|---|---|---|---|---|---|---|---|---|---|---|---|---|
| | Feed | — | 540 | 46 | <2 | 5 | 290 | <0.1 | <0.1 | — | — | — |
| B2 | Treated | 10.0 | 2 | 5 | 6 | 3125 | 1085 | <0.1 | 0.4 | 2.9 | 9 | 71 |
| | Feed | — | 518 | 93 | <10 | 4 | 280 | <0.1 | <0.1 | — | — | — |
| B9 | Treated | 10.0 | <2 | 5 | 16 | 2725 | 1010 | <0.1 | 0.3 | 3.1 | 10 | 51 |

EXAMPLE XIV

The effect of $SO_2$ in the copper/nickel catalysed system is examined in Table XIV. In these tests, which were conducted under similar operating conditions, the $SO_2$ dosage was varied from approximately 0.7 to 2.9 g $SO_2$/g $S_2O_3^{2-}$. Approximately 70 mg/L nickel and 10 mg/L copper were added in each test.

A good effluent quality was achieved with an $SO_2$ dosage of 1.4 g $SO_2$/g $S_2O_3^{2-}$; however, levels of tetrathionate and trithionate remained slightly elevated. Improved results were achieved at the higher dosage approximately 2.9 g $SO_2$/g $S_2O_3^{2-}$. At this dosage, complete oxidation of $S_2O_3^{2-}$ to $SO_4^{2-}$ was achieved.

TABLE XIV

THIOSULFATE REMOVAL FROM SYNTHETIC SOLUTION EFFECT
OF $SO_2$ AT CONSTANT $Cu^{2+}$ AT CONSTANT $Ni^{2+}$ ADDITION, AT ROOM TEMPERATURE

Feed: Synthetic solution: 500 mg/L $S_2O_3^{2-}$ as $Na_2S_2O_3.5H_2O$
Conditions: Continuous flow thiosulfate removal using $Na_2S_2O_5$ as $SO_2$ reagent, $Cu^{2+}$ reagent as a solution of $CuSO_4.5H_2O$, $Ni^{2+}$ reagent as a solution of $NiSO_4.6H_2O$, $Ca(OH)_2$ for maintaining pH, 700 ml reactor volume, 800 rpm agitator speed, 1.0 L/min. air flow, 60 minutes retention time.

| Test | Stream | pH | Assays (mg/L) | | | | | | | Reagents | | |
| | | | $S_2O_3^{2-}$ | $S_4O_6^{2-}$ | $S_3O_6^{2-}$ | $SO_4^{2-}$ | $S_{TOT}$ | Cu | Ni | $SO_2$ g/g $S_2O_3^{2-}$ | $Cu^{2+}$ mg/L | $Ni^{2+}$ mg/L |
|---|---|---|---|---|---|---|---|---|---|---|---|---|
| | Feed | — | 540 | 46 | <2 | 5 | 290 | <0.1 | <0.1 | — | — | — |
| B2 | Treated | 10 | 2 | 5 | 6 | 3125 | 1085 | <0.1 | 0.4 | 2.9 | 9 | 71 |
| | Feed | — | 523 | 15 | <10 | 2 | 293 | <0.1 | <0.1 | — | — | — |
| B10 | Treated | 10 | <2 | 30 | 34 | 1750 | 700 | <0.1 | 0.6 | 1.4 | 10 | 70 |
| | Feed | — | 540 | 47 | <10 | 2 | 289 | <0.1 | <0.1 | — | — | — |
| B11 | Treated | 10 | 180 | 17 | 165 | 1100 | 503 | 1.4 | 0.2 | 0.7 | 10 | 71 |

EXAMPLE XV

Example XV demonstrates the effective treatment of high concentration feed in the copper/nickel catalysed system. In test B12, 1642 mg/L $S_2O_3^{2-}$ was successfully oxidized to $SO_4^{2-}$ using 1.9 g/g $S_2O_3^{2-}$, 9 mg/L $Cu^{2+}$ and 94 mg/L $Ni^{2+}$. The reaction was conduted at pH 10, and a retention time of 182 minutes was used.

TABLE XV

THIOSULFATE REMOVAL FROM SYNTHETIC SOLUTION TREATMENT OF HIGH CONCENTRATION FEED IN $Cu^{2+}/Ni^{2+}$ SYSTEM, AT ROOM TEMPERATURE

Feed: Synthetic solution: 1500 mg/L $S_2O_3^{2-}$ as $Na_2S_2O_3.5H_2O$
Conditions: Continuous flow thiosulfate removal using $Na_2S_2O_5$ as $SO_2$ reagent, $Cu^{2+}$ reagent as a solution of $CuSO_4.5H_2O$, $Ni^{2+}$ reagent as a solution of $NiSO_4.6H_2O$, $Ca(OH)_2$ for maintaining pH, 800 ml reactor volume, 1000 rpm agitator speed, 1.0 L/min. air flow, 182 minutes retention time.

| | | | Assays | | | | | | | Reagents | | |
|---|---|---|---|---|---|---|---|---|---|---|---|---|
| | | | (mg/L) | | | | | | | $SO_2$ | $Cu^{2+}$ | $Ni^{2+}$ |
| Test | Stream | pH | $S_2O_3^{2-}$ | $S_4O_6^{2-}$ | $S_3O_6^{2-}$ | $SO_4^{2-}$ | $S_{TOT}$ | Cu | Ni | g/g $S_2O_3^{2-}$ | mg/L | mg/L |
| | Feed | — | 1642 | 129 | <10 | 3925 | 2195 | <0.1 | 0.1 | — | — | — |
| B12 | Treated | 10 | <2 | 15 | 34 | 8330 | 2720 | <0.1 | 0.1 | 1.9 | 9 | 94 |

EXAMPLE XVI

In Table XVI, the effect of pH, at low temperature, was examined in the copper/nickel catalysed system. In tests B13 and B14, the pH was varied from 10 to 10.5. In each case, the $SO_2$ dosage was maintained at approximately 2.8 g/g $S_2O_3^{2-}$. Copper and nickel were added at 10 and 250 mg/L respectively.

Incomplete oxidation was observed in each case; however, better results were achieved at pH 10.0. Results achieved at room temperature confirm that the optimum operating pH would be in the range of approximately 9.5 to 10, refer to Table XI.

TABLE XVI

THIOSULFATE REMOVAL FROM SYNTHETIC SOLUTION EFFECT OF pH AT CONSTANT $Cu^{2+}$ AT AND $Ni^{2+}$ ADDITION, AT LOW TEMPERATURE

Feed: Synthetic solution: 500 mg/L $S_2O_3^{2-}$ as $Na_2S_2O_3.5H_2O$
Conditions: Continuous flow thiosulfate removal using $Na_2S_2O_5$ as $SO_2$ reagent, $Cu^{2+}$ reagent as a solution of $CuSO_4.5H_2O$, $Ni^{2+}$ reagent as a solution of $NiSO_4.6H_2O$, $Ca(OH)_2$ for maintaining pH, 700 ml reactor volume, 800 rpm agitator speed, 1.0 L/min. air flow, 60 minutes retention time.

| | | | | Assays | | | | | | | Reagents | | |
|---|---|---|---|---|---|---|---|---|---|---|---|---|---|
| | | | Temp | (mg/L) | | | | | | | $SO_2$ | $Cu^{2+}$ | $Ni^{2+}$ |
| Test | Stream | pH | °C. | $S_2O_3^{2-}$ | $S_4O_6^{2-}$ | $S_3O_6^{2-}$ | $SO_4^{2-}$ | $S_{TOT}$ | Cu | Ni | g/g $S_2O_3^{2-}$ | mg/L | mg/L |
| | Feed | — | 4 | 555 | 48 | <10 | 13 | 283 | <0.1 | <0.1 | — | — | — |
| B13 | Treated | 10.0 | 5 | <10 | 55 | 36 | 3055 | 1135 | <0.1 | 2.6 | 2.9 | 11 | 250 |
| B14 | Treated | 10.5 | 5 | <10 | 156 | 52 | 2825 | 1115 | <0.1 | 0.8 | 2.7 | 10 | 250 |

EXAMPLE XVII

The effect of retention time at low temperature is examined in Table XVII. During low temperature treatment, the retention time was varied from 120 to 180 minutes. In each case, nickel and copper were added at approximately 240 and 10 mg/L respectively. The pH of the system was maintained at 10.

Incomplete oxidation of thiosalts was observed in test B13 in which a retention time of 120 minutes was used. Although test B15 was operated at a slightly lower $SO_2$ dosage, the increased retention time of 180 minutes served to improve the oxidation observed.

TABLE XVII

THIOSULFATE REMOVAL FROM SYNTHETIC SOLUTION
EFFECT OF RETENTION TIME, AT LOW TEMPERATURE

Feed: Synthetic solution: 500 mg/L $S_2O_3^{2-}$ as $Na_2S_2O_3.5H_2O$
Conditions: Continuous flow thiosulfate removal using $Na_2S_2O_5$ as $SO_2$ reagent, $Cu^{2+}$ reagent as a solution of $CuSO_4.5H_2O$, $Ni^{2+}$ reagent as a solution of $NiSO_4.6H_2O$, $Ca(OH)_2$ for maintaining pH, 700 ml reactor volume, 800 rpm agitator speed, 1.0 L/min. air flow.

| Test | Stream | pH | Temp °C. | Ret'n Time (min) | $S_2O_3^{2-}$ | $S_4O_6^{2-}$ | $S_3O_6^{2-}$ | $SO_4^{2-}$ | $S_{TOT}$ | Cu | Ni | $SO_2$ g/g $S_2O_3^{2-}$ | $Cu^{2+}$ mg/L | $Ni^{2+}$ mg/L |
|---|---|---|---|---|---|---|---|---|---|---|---|---|---|---|
| | Feed | 5.5 | 4 | — | 555 | 48 | <10 | 13 | 283 | <0.1 | <0.1 | — | — | — |
| B13 | Treated | 10.0 | 5 | 120 | <10 | 55 | 36 | 3055 | 1135 | <0.1 | 2.6 | 2.9 | 11 | 250 |
| | Feed | 8.5 | 4 | — | 587 | 75 | <10 | 10 | 291 | <0.1 | <0.1 | — | — | — |
| B15 | Treated | 10.0 | 5 | 182 | <10 | 32 | 10 | 2750 | 1040 | <0.1 | 3.3 | 2.5 | 10 | 241 |

EXAMPLE XVIII

The effect of cobalt addition was examined in a number of experiments. Typical results can be found in Table XVIII. In these tests, the $SO_2$ dosage was maintained at approximately 2.5 g/g $S_2O_3^{2-}$. The system was operated at a retention time of 60 minutes.

An excellent effluent quality was achieved with the addition of 76 mg/L $Co^{2+}$ at a pH of 9.0; only partial oxidation of thiosulfate was achieved at the lower addition rate of 11 mg/L $Co^{2+}$. Copper addition was not required to achieve effective oxidation; however, trace amounts of $Cu^{2+}$ were present within the system, and it is suspected that $Cu^{2+}$ did play a role in the reaction.

TABLE XVIII

THIOSULFATE REMOVAL FROM SYNTHETIC SOLUTION
EFFECT OF $Co^{2+}$ ADDITION AT CONSTANT pH, AT ROOM TEMPERATURE

Feed: Synthetic solution: 500 mg/L $S_2O_3^{2-}$ as $Na_2S_2O_3.5H_2O$
Conditions: Continuous flow thiosuflate removal using $Na_2S_2O_5$ as $SO_2$ reagent, $Co^{2+}$ reagent as a solution of $CoSO_4.7H_2O$, $Ca(OH)_2$ for maintaining pH, 800 ml reactor volume, 1000 rpm agitator speed, 1.0 L/min. air flow, 60 minutes retention time.

| Test | Stream | pH | $S_2O_3^{2-}$ | $S_4O_6^{2-}$ | $S_3O_6^{2-}$ | $SO_4^{2-}$ | $S_{TOT}$ | *Cu | Co | $SO_2$ g/g $S_2O_3^{2-}$ | $Co^{2+}$ (mg/L) |
|---|---|---|---|---|---|---|---|---|---|---|---|
| | Feed | 5.8 | 570 | 108 | <10 | 3 | 288 | <0.1 | <0.1 | — | — |
| C1 | Treated | 9.0 | <2 | <2 | <2 | 2890 | 1045 | <0.1 | 0.1 | 2.8 | 76 |
| C2 | Treated | 9.0 | 180 | 60 | 380 | 1600 | 979 | <0.1 | 1.0 | 2.5 | 11 |

Note:
*Trace amounts of copper were present within the system.

EXAMPLE XIX

In Table XIX, test C3 demonstrates the effective treatment of high concentration feed, containing approximately 1642 mg/L $S_2O_3^{2-}$, using $SO_2$ and $O_2$ in the presence of cobalt and copper. In this system, an excellent effluent quality was achieved at pH 9.0 with the addition of 2.8 g $SO_2$/g $S_2O_3^{2-}$, 1 mg/L $Cu^{2+}$ and 94 mg/L $Co^{2+}$. The system was operated at a retention time of approximately 177 minutes.

Although the use of cobalt alone was effective in the treatment of feed solutions containing approximately 500 mg/L $S_2O_3^{2-}$, when treating feeds of higher concentrations, a very small amount, 1 mg/L of copper, was added in conjunction with cobalt. It was thought that the addition of a small amount of copper would be beneficial to the reaction.

TABLE XIX

THIOSULFATE REMOVAL FROM SYNTHETIC SOLUTION
ROOM TEMPERATURE TREATMENT OF HIGH CONCENTRATION FEED USING $Co^{2+}/Cu^{2+}$ CATALYST

Feed: Synthetic solution: 1500 mg/L $S_2O_3^{2-}$ as $Na_2S_2O_3 \cdot 5H_2O$
Conditions: Continuous flow thiosulfate removal using $Na_2S_2O_5$ as $SO_2$ reagent, $Cu^{2+}$ reagent as a solution of $CuSO_4 \cdot 5H_2O$, $Co^{2+}$ reagent as a solution of $CoSO_4 \cdot 7H_2O$, $Ca(OH)_2$ for maintaining pH, 800 ml reactor volume, 1000 rpm agitator speed, 1.0 L/min. air flow, 177 minutes retention time.

| | | | Assays | | | | | | | | Reagents | | |
|---|---|---|---|---|---|---|---|---|---|---|---|---|---|
| | | | (mg/L) | | | | | | | | $SO_2$ | $Cu^{2+}$ | $Co^{2+}$ |
| Test | Stream | pH | $S_2O_3^{2-}$ | $S_4O_6^{2-}$ | $S_3O_6^{2-}$ | $SO_4^{2-}$ | $S_{TOT}$ | Cu | Ni | Co | g/g $S_2O_3^{2-}$ | mg/L | mg/L |
| | Feed | — | 1642 | 129 | <10 | 3925 | 2195 | <0.1 | 0.1 | 0.1 | — | — | — |
| C3 | Treated | 9.0 | <2 | <2 | 4 | 8660 | 2790 | <0.1 | 0.1 | 0.1 | 2.8 | 1 | 94 |

EXAMPLE XX

A number of feeds containing high concentrations of the various thiosalts of interest were prepared. The catalyzing effect of $Co^{2+}$ on the oxidation of each of these thiosalts was investigated at pH 9.0 and a retention time of 60 minutes. These results are presented in Table XX.

At a cobalt addition rate of approximately 70 mg/L and an $SO_2$ dosage of approximately 2.5 g/g thiosalt, excellent removal was achieved in each case.

TABLE XX

THIO-SPECIES REMOVAL FROM SYNTHETIC SOLUTION
THE EFFIECIENCY OF REMOVAL OF EACH THIOSALT AT CONSTANT OPERATING CONDITIONS

Feed: Synthetic solution: A: 500 mg/L $S_2O_3^{2-}$ as $Na_2S_2O_3 \cdot 5H_2O$
B: 300 mg/L $S_4O_6^{2-}$ as $K_2S_4O_6$
C: 300 mg/L $S_3O_6^{2-}$ as $K_2S_3O_6$
Conditions: Continuous flow thiosulfate removal using $Na_2S_2O_5$ as $SO_2$ reagent, $Co^{2+}$ reagent as a solution of $CoSO_4 \cdot 7H_2O$, $Ca(OH)_2$ for maintaining pH, 800 ml reactor volume, 1000 rpm agitator speed, 1.0 L/min. air flow, 60 minutes retention time.

| | | | Assays (mg/L) | | | | | | | Reagents | | | |
|---|---|---|---|---|---|---|---|---|---|---|---|---|---|
| | | | | | | | | | | $SO_2$ | $SO_2$ | $SO_2$ | $Co^{2+}$ |
| Test | Stream | pH | $S_2O_3^{2-}$ | $S_4O_6^{2-}$ | $S_3O_6^{2-}$ | $SO_4^{2-}$ | $S_{TOT}$ | *Cu | Co | g/g $S_2O_3^{2-}$ | g/g $S_4O_6^{2-}$ | g/g $S_3O_6^{2-}$ | mg/L |
| | Feed | 5.8 | 570 | 108 | <10 | 3 | 288 | <0.1 | <0.1 | — | — | — | — |
| D1 | Treated | 9.0 | <2 | <2 | <2 | 2890 | 1045 | <0.1 | 0.1 | 2.8 | — | — | 76 |
| | Feed | 5.2 | <10 | 349 | <10 | 10 | 172 | <0.1 | <0.1 | — | — | — | — |
| D2 | Treated | 9.0 | <2 | 3 | <2 | 1730 | 598 | <0.1 | <0.1 | — | 2.5 | — | 72 |
| | Feed | 4.4 | 8 | 8 | 359 | 8 | 143 | <0.1 | <0.1 | — | — | — | — |
| D3 | Treated | 9.0 | <2 | <2 | <2 | 1680 | 624 | <0.1 | <0.1 | — | — | 2.6 | 71 |

Note: *Trace amounts of copper were present within the system.

EXAMPLE XXI

Sulfide was completely oxidized using $SO_2$ and $O_2$ in the presence of a metal catalyst. Table XXI shows typical results achieved when $Co^{2+}$ was used to catalyze the oxidation reaction. As can be seen in test F1, excellent results were achieved with the addition of 10 g $SO_2$/g $S^{2-}$ and approximately 70 mg/L $Co^{2+}$ at a retention time of 60 minutes and a pH of 9.0.

TABLE XXI

SULFIDE REMOVAL FROM SYNTHETIC SOLUTION
USING $Co^{2+}$ AS CATALYST, AT ROOM TEMPERATURE

Feed: Synthetic solution: 100 mg/L $S^{2-}$ as $Na_2S.9H_2O$
Conditions: Continuous flow sulfide removal using $Na_2S_2O_5$ as $SO_2$ reagent, $Co^{2+}$ reagent as a solution of $CoSO_4.7H_2O$, $Ca(OH)_2$ suspension for maintaining pH, 800 ml reactor volume, 1000 rpm agitator speed, 1.0 L/min. air flow, 60 minutes retention time.

| Test | Stream | pH | Assays (mg/L) | | | | | | | Reagents | |
|------|--------|------|----------|------------|------------|------------|------------|-----------|------|------------------|----------------|
| | | | $S^{2-}$ | $S_2O_3^{2-}$ | $S_4O_6^{2-}$ | $S_3O_6^{2-}$ | $SO_4^{2-}$ | $S_{TOT}$ | Co | $SO_2$ g/g $S^{2-}$ | $Co^{2+}$ mg/L |
| | Feed | 11.3 | 100 | 25 | <10 | <10 | 66 | 103 | <0.1 | — | — |
| F1 | Treated | 9.0 | <2 | <10 | <10 | <10 | 1720 | 607 | <0.1 | 10.0 | 71 |

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A method for the treatment of low valent sulfur compounds contained in aqueous solution, the method comprising introducing a source of oxygen and sulfur dioxide to the aqueous solution in the presence of at least one transition metal catalyst selected from the group consisting of copper, iron, manganese, nickel and cobalt, maintaining the pH of the aqueous solution about 2 to 11 and oxidizing the low valent sulfur compounds to sulfate.

2. The method according to claim 1 wherein the metal catalyst is entrained in the aqueous solution.

3. The method according to claim 1 wherein the metal catalyst is introduced to the aqueous solution.

4. The method according to claim 1 wherein the temperature of the aqueous solution is ambient temperature.

5. The method according to claim 1 wherein the temperature of the aqueous solution is from about freezing to about room temperature.

6. The method according to claim 1 wherein the sulfur dioxide is introduced as a liquid.

7. The method according to claim 1 wherein the sulfur dioxide is introduced as a gas.

8. The method according to claim 1 wherein the sulfur dioxide is introduced as a soluble salt solution.

9. The method according to claim 1 wherein the source of oxygen is selected from the group consisting of pure oxygen and air.

10. The method according to claim 1 wherein the low valent sulfur compounds are selected from the group consisting of $S^{2-}$, $S_2O_3^{2-}$, $S_4O_6^{2-}$ and $S_3O_6^{2-}$.

11. The method according to claim 1 wherein the weight ratio of sulfur dioxide to the low valent sulfur compounds ranges from about 1.5 to 10.

12. The method according to claim 1 wherein a basic compound regulates the pH of the aqueous solution.

13. The method according to claim 1 wherein the low valent sulfur compound is a thiosalt.

14. The method according to claim 1 wherein copper and nickel are the metal catalysts.

15. The method according to claim 14 wherein the pH of the aqueous solution is about 8 to 10.5.

16. The method according to claim 14 wherein the copper added or present in the aqueous solution is about one milligram per liter.

17. The method according to claim 14 wherein the copper added or present in aqueous solution is in the range of approximately 1 to 60 milligrams per liter.

18. The method according to claim 14 wherein the nickel added or present in the aqueous solution is in the range of approximately 25 to 250 milligrams per liter.

19. The method according to claim 1 wherein iron and manganese are the metal catalysts.

20. The method according to claim 19 wherein the pH of the aqueous solution is about 2.5 to 5.0.

21. The method according to claim 19 wherein the iron present in the aqueous solution is in excess of about 25 milligrams per liter.

22. The method according to claim 19 wherein the manganese present in the aqueous solution is equal to or in excess of about 25 milligrams per liter.

23. The method according to claim 19 wherein the iron is added as a solution of trivalent iron to the aqueous solution.

24. The method according to claim 1 wherein copper and manganese are the metal catalysts.

25. The method according to claim 24 wherein the pH of the aqueous solution is about 5 to 6.

26. The method according to claim 24 wherein the copper added or present in the aqueous solution is in excess of about 5 milligrams per liter.

27. The method according to claim 1 wherein cobalt is the metal catalyst.

28. The method according to claim 27 wherein the pH of the aqueous solution is about 9.

29. The method according to claim 27 wherein the low valent sulfur compound is $S^{2-}$.

30. The method according to claims 27 wherein the cobalt is added or present at a concentration in excess of about 10 milligrams per liter.

31. The method according to claim 1 wherein the concentration of low valent sulfur compounds is in the range of approximately 100 to 1,600 milligrams per liter.

32. The method according to claim 1 wherein the time of the treatment is from about 60 minutes to 240 minutes.

33. The method according to claim 1 wherein metal catalysts selected from the group consisting of lead, zinc, copper, nickel and cobalt are present in the aqueous solution in the range of approximately 1 to 200 milligrams per liter.

* * * * *